(12) United States Patent
Foltzer

(10) Patent No.: US 6,389,200 B1
(45) Date of Patent: May 14, 2002

(54) WIDE TUNING RANGE FIBER BRAGG GRATING FILTER (FBGF) USING MUSCLE WIRE

(75) Inventor: Lawrence E. Foltzer, Occidental, CA (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/473,754

(22) Filed: Dec. 28, 1999

(51) Int. Cl.[7] .................................................. G02B 6/34
(52) U.S. Cl. .............................. 385/37; 385/24; 385/39; 385/13; 359/130
(58) Field of Search ........................... 385/37, 24, 39, 385/12, 13; 359/130, 187

(56) References Cited

U.S. PATENT DOCUMENTS

| | | | |
|---|---|---|---|
| 5,694,501 A | * 12/1997 | Alavie et al. | 385/37 |
| 5,892,582 A | 4/1999 | Bao et al. | 356/345 |
| 5,982,791 A | 11/1999 | Sorin et al. | 372/25 |
| 5,999,546 A | 12/1999 | Espindola et al. | 372/20 |
| 6,044,189 A | 3/2000 | Miller | 385/37 |
| 6,111,681 A | * 8/2000 | Mizrahi et al. | 359/130 |
| 6,122,421 A | * 9/2000 | Adams et al. | 385/37 |

* cited by examiner

Primary Examiner—Darren Schuberg
Assistant Examiner—Fayez Assaf
(74) Attorney, Agent, or Firm—Smith, Danamraj & Youst; V. Lawrence Sewell; Jessica W. Smith

(57) ABSTRACT

An optical filter having a wide tuning range and a method of making the same. A fiber Bragg grating member having a selected grating pitch is coupled to a plurality of actuating members such as Shape Memory Alloys. A current source or thermal source is included for providing a controlled amount of current or heat so as to cause a change in the length of the actuating members. The length of the fiber Bragg grating member is accordingly changed also. The grating pitch is correspondingly altered, thereby causing a change in the Bragg resonance wavelength of the grating. In response, a reflected optical signal selected from incoming multiplexed optical signals tunes to a different wavelength. A closed-loop controller is provided for controlling energy inputs to the actuating members to modulate the tuning of the reflected optical signals.

25 Claims, 7 Drawing Sheets

WIDE TUNING RANGE FIBER BRAGG GRATING FILTER (FBGF) USING MUSCLE WIRE

BACKGROUND OF THE INVENTION

1. Technical Field of the Invention

The present invention relates to optical network elements and, more particularly, to a fiber Bragg grating filter (FBGF) having a wide tuning range and a method of making the same using Shape Memory Alloys.

2. Description of Related Art

As networks face increasing bandwidth demand and diminishing fiber availability in the existing fiber plant, network providers are migrating towards a new network technology called the optical network. Optical networks are high-capacity telecommunications networks comprised of optical and opto-electronic technologies and components, and provide wavelength-based services in addition to signal routing, grooming, and restoration at the wavelength level. These networks, based on the emergence of the so-called optical layer operating entirely in the optical domain in transport networks, can not only support extraordinary capacity (up to terabits per second (Tbps)), but also provide reduced costs for bandwidth-intensive applications such as the Internet, interactive video-on-demand and multimedia, and advanced digital services.

Of the several key enabling technologies necessary for the successful deployment of optical networks, two are particularly significant: dense wavelength division multiplexing (DWDM) and Erbium-Doped Fiber Amplifiers (EDFAs). DWDM is a fiber-optic transmission technique that has emerged as a crucial component for facilitating the transmission of diverse payloads regardless of their bit-rate and format over the optical layer DWDM increases the capacity of embedded fiber by first assigning incoming optical signals to specific wavelengths within a designated frequency band (i.e., channels separated by sub-nanometer spacing) and then multiplexing the resulting signals out onto a single fiber. Because incoming signals are not terminated in the optical layer, the interface is bit-rate and format independent, allowing service/network providers to integrate the DWDM technology with existing equipment in the network.

By combining multiple optical signals using DWDM, they can be amplified as a group and transported over a single fiber to increase capacity in a cost-effective manner. Each signal carried can be at a different rate (e.g., Optical Carrier (OC)-3, OC-12, OC-48, etc.) and in a different format (e.g., Synchronous Optical Network (SONET) and its companion Synchronous Digital Hierarchy (SDH), Asynchronous Transfer Mode (ATM), Internet Protocol (IP) data, etc.).

Current advances in DWDM technologies allow a large number of wavelengths to be multiplexed over a fiber using sub-nanometer spacing. For example, up to 32 channels or carriers may be spaced 100 GHz apart (equal to 0.8 nm) in a multiplexed optical signal operating at around 1550 nm. In contrast, some of the standardized, "coarse" wavelength separations include 200 GHz spacing (1.6 nm) and 400 GHz spacing (3.2 nm), both at around 1550 nm.

Several advances are also taking place in the field of optical amplifiers which operate in a specific band of frequency spectrum and boost lightwave signals to extend their reach without converting them back to electrical form. To optically amplify the individual wavelengths of multiplexed signals, optical amplifiers need to have a gain bandpass that extends over the entire range of the DWDM signal's bandwidth. For example, for 32 channels with a spacing of 0.8 nm around the 1500 nm band, the signal bandwidth is about 26 nm and, accordingly, the spectral gain profile of the optical amplifier should cover at least this range. Advanced optical amplifiers such as the EDFAs—which have a gain profile of about 30 to 50 nm—are currently being employed in optical networks using DWDM transmission techniques.

Those skilled in the art should readily recognize that in order to fully realize the benefits of such advances as DWDM techniques and EDFAs in optical networks, the ability to separate the individual wavelengths in a multiplexed optical signal is critical because these wavelengths typically need to be routed to individual detectors at the end of the transmission. Although various optical filtering technologies are currently available for this purpose, there exist several drawbacks and deficiencies in the state-of-the-art solutions.

For example, wavelength separators using interference filters and Fabry-Perot filters typically have a low resolution which renders them a poor choice for the sub-nanometer spacing of the current DWDM techniques. Further, these filters do not have a quick enough response time for achieving any degree of tunability, that is, the ability to select different wavelengths using the same filter, in a practical manner.

Optical filters made of fiber Bragg gratings offer excellent resolution characteristics. However, current implementations such as, for example, acoustic-optical fiber Bragg gratings and piezo-electric Bragg gratings, allow tuning over a few nanometers only, which approximates to about 5 or 6 channels. Clearly, this tuning range is insufficient to cover the channel bandwidth of the advanced DWDM systems described hereinabove.

Based upon the foregoing, it should be apparent that there is an acute need for an optical filter solution that provides a wide tuning range for selecting wavelengths among a large number of channels available in today's DWDM systems. Additionally, it would be advantageous to have a narrow optical passband (for the selected wavelength) so as to be able to tune to a particular wavelength more precisely without optical crosstalk effects. It would be of further advantage to provide the capability for tuning over a range that is at least co-extensive with the gain profiles of the advanced EDFAs used in current optical networks. The present invention provides such a solution.

SUMMARY OF THE INVENTION

Accordingly, the present invention is directed in one aspect to a tunable optical filter having a wide response range. The optical filter comprises a fiber having a selected length for conducting optical signals, wherein a Bragg grating with a predetermined period of a refractive index (i.e., the grating pitch) is included for reflecting back a reflected optical signal having the Bragg resonance wavelength. An actuator is coupled to the fiber for varying the period of the refractive index by changing the length of the fiber. A closed-loop controller is included for controlling the actuator by monitoring a relevant optical or electrical parameter (or, a plurality of parameters) associated with the reflected optical signal.

In one exemplary embodiment, the actuator comprises a plurality of Shape Memory Alloy (SMA) members having substantially the same length and diameter as the fiber member. In a presently preferred implementation, six SMA members are disposed around the fiber member in a hexagonal configuration ("hex-pack") such that the ends of the SMA members are bonded to the ends of the fiber member. A current or thermal source is also included as part of the actuator arrangement to provide a controlled energy input (current or heat) to the SMA members which compress upon receiving the energy. Because of the contraction in the length of the SMA members, the length of the fiber member is also compressed. Accordingly, the grating pitch of the fiber Bragg grating member is shortened as well. The Bragg resonance wavelength—which matches the wavelength of the reflected optical signal—tunes to the shorter end of the tuning range in correspondence to the change in the grating pitch.

In another aspect, the present invention is directed to a method of making a wide tuning range optical filter using a fiber Bragg grating member of a predetermined grating pitch. Preferably, a single-mode fiber of selected length and diameter is exposed to coherent UV radiation. An interference pattern of the UV radiation is thereby generated along the length of the single-mode fiber, wherein the interference fringe pattern's periodicity matches the desired grating pitch. The interaction between the UV light and the fiber produces periodic changes in the index of refraction of the fiber such that the periodic changes spatially correspond to the interference fringe pattern's periodicity.

Thereafter, multiple SMA members having substantially the same length and diameter as the fiber (with the Bragg grating "written" into it as set forth above) are disposed longitudinally around the fiber such that the ends of the SMA members are bonded to the ends of the fiber. In a preferred exemplary embodiment of the present invention, six SMA members are arranged in a hex-pack configuration surrounding the fiber. A current or thermal source is coupled to the SMA members to provide energy thereto. A closed-loop controller is connected to the current/thermal source to modulate the amount of energy supplied to the SMA members. By controlling the amount of energy, the Bragg grating pitch is varied so that the reflected optical signals tune to appropriate wavelengths.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF THE DRAWINGS

Figure 1A:
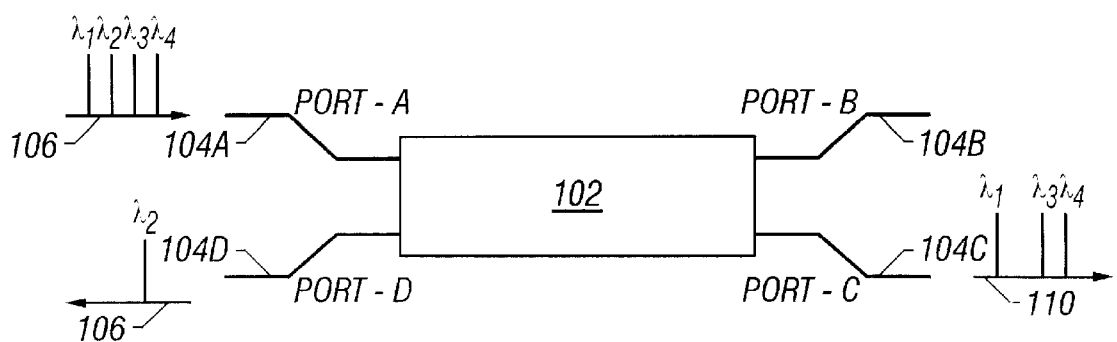
FIG. 1A depicts a fiber Bragg grating (FBG) element disposed in an optical coupler arrangement which exemplifies wavelength selectivity properties of the FBG element.

In the drawings, like or similar elements are designated with identical reference numerals throughout the several views thereof, and the various elements depicted are not necessarily drawn to scale. Referring now to FIG. 1, depicted therein is a fiber Bragg grating (FBG) element 102 disposed in an optical coupler arrangement that exemplifies wavelength selectivity characteristics of the FBG element 102. As is well known, a fiber Bragg grating is a section of fiber having a selected length that has been modified to contain periodic changes in its index of refraction along the length. This spatial periodicity in the index of refraction is generally referred to as the grating pitch. Depending on the space between the changes (i.e., the pitch), a certain frequency of light—the Bragg resonance wavelength—is reflected back, while all other wavelengths pass through the fiber.

Four ports are exemplified in the optical coupler arrangement shown in FIG. 1: two input ports, port-A 104A and port-D 104D, and two output ports, port-B 104B and port-C 104C. A high degree of optical separation between the two input ports, i.e., between port-A and port-D, and the two output ports, i.e., port-B and port-C, is typically available in the optical coupler arrangement described herein. For example, a power difference of about 50 dB is maintained between the two input ports.

A multiplexed optical signal having four wavelengths, $\lambda_1$–$\lambda_4$, is provided as an incoming signal 106 at the input port-A 104A. In this exemplary arrangement, port-B 104B may be optically terminated by conventional means so that port-C 104C operates as the output port for these wavelengths. As the multiplexed optical signal passes through the FBG element 102, a selected wavelength—the wavelength corresponding to the Bragg resonance wavelength—of the optical signal is reflected back to the optically separated port-D. This reflected signal 108 is exemplified as having a wavelength of $\lambda_2$. The remaining wavelengths, $\lambda_1$, $\lambda_3$ and $\lambda_4$, are transmitted as an output signal 110 at the output port-C 104C.

Figure 1B:
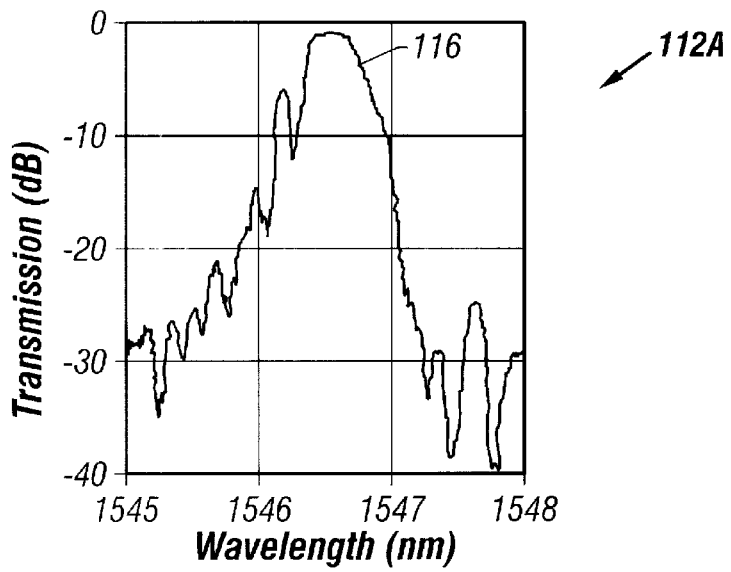
FIGS. 1B and 1C depict the signal spectra associated with the FBG element shown in FIG. 1A.
Figure 1C:
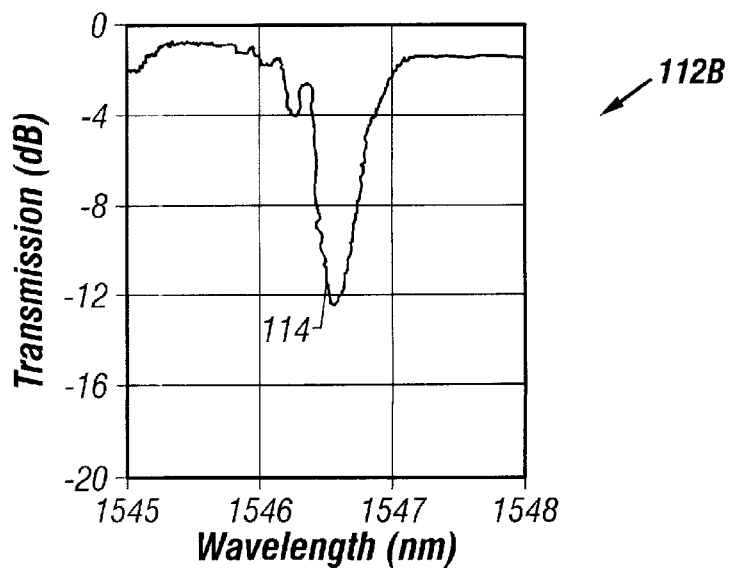

FIG. 1B depicts the spectra associated with the transmitted and reflected optical signals in the exemplary FBG arrangement described hereinabove. Reference numeral 112A refers to the spectrum of the reflected signal 108 having a peak 116 at around 1546.5 nm. That is, in this example, the Bragg resonance wavelength of the FBG element 102 is provided to be around this wavelength. Reference numeral 112B refers to the spectrum of the transmitted signal 110 and comprises a notch 114 at the wavelength that corresponds to the wavelength ($\lambda_2$) of the peak 116 of the reflected signal 108.

Those skilled in the art will recognize upon reference hereto that the wavelength-specific transmission properties of the FBG element 102 are useful in implementing a suitable optical filter for selecting different wavelengths from a multiplexed optical carrier signal such as, for example, a DWDM optical signal having up to 32 or more channels. However, as described in the Background section of the present patent application, conventional optical filters using FBG elements have the disadvantage of being tunable over a narrow band of about a few nanometers only (i.e., about 5 or 6 channels).

Figure 2A:
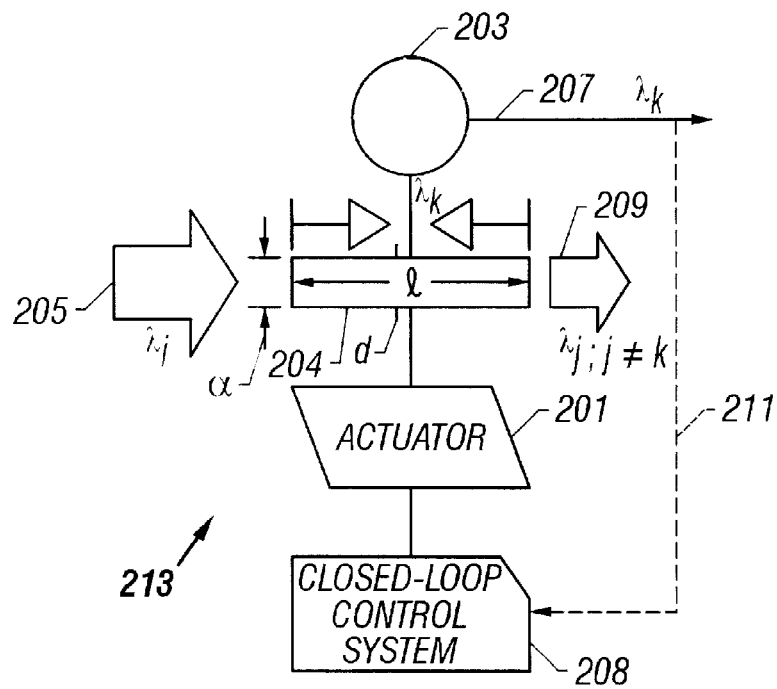
FIG. 2A depicts a functional block diagram of an exemplary embodiment of a wide tuning range FBG filter (FBGF) provided in accordance with the teachings of the present invention.

Referring now to FIG. 2A, depicted therein is a functional block diagram of an optical filter 213 having a wide tunable range, provided in accordance with the teachings of the present invention. An FBG element 204 of selected physical dimensions i.e., length (l) and diameter (d), is coupled to an actuator 201 such that the length of the FBG element is altered in a controlled manner. Preferably, the actuator 201 operates to compress and shorten the FBG element 204 whereby the grating pitch (i.e., the spatial periodicity of the refractive index of the fiber) of the FBG element is also compressed accordingly. The Bragg resonance wavelength associated with the FBG element is thus altered correspondingly such that a reflected wave tunes towards the shorter end (i.e., higher frequency, because $c=f.\lambda$, where c is the speed of light, f is the frequency, and $\lambda$ is the wavelength) of the tunable range of the filter 213. Thereafter, the reflected wave may be separated using a conventional optical element such as a circulator 203 to provide the reflected signal (having $\lambda_k$ as the wavelength) as a filtered signal output 207 from the filter. Accordingly, multiple wavelengths $\lambda_i$, i=1 to N, of an incoming multiplexed optical signal 205 are individually selected, and the wavelengths not selected may be transmitted as a transmitted signal 209 (having $\lambda_j$, j=1 to N and j≠k) to subsequent optical stages.

Continuing to refer to FIG. 2A, the response of the actuator 201 affecting the length of the FBG element 204 is preferably modulated by a closed-loop control system 208 so that the optical filter 213 may be tuned to a particular wavelength of the incoming wavelengths. A feedback path 211 is accordingly provided from the filtered signal output 207 wherein one or more suitable parameters associated with the filtered signal are furnished to the control system 208. Those skilled in the art should appreciate that the filtered signal may be appropriately processed using known optoelectronics before relevant parameters are extracted for the closed-loop feedback purposes.

Figure 2B:
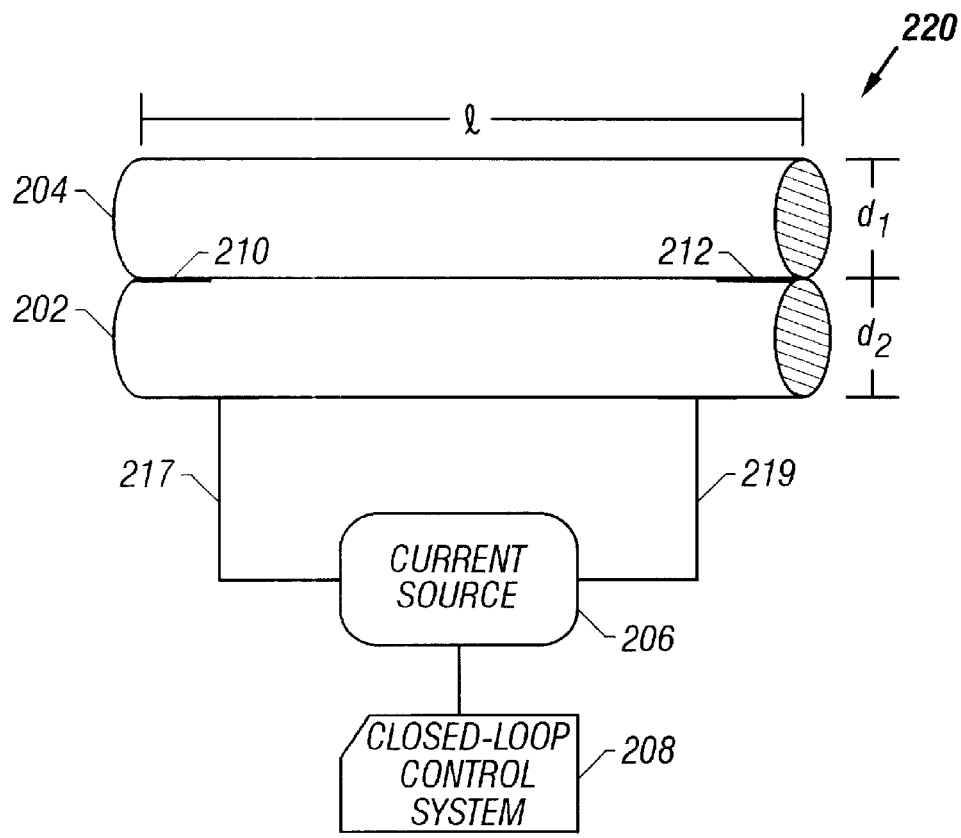
FIG. 2B depicts an exemplary embodiment of a wide tuning range FBGF of the present invention using at least one Shape Memory Alloy (SMA) member.

FIG. 2B depicts an exemplary wide tuning range FBG filter (FBGF) of the present invention wherein at least one Shape Memory Alloy (SMA) member 202 is provided as an actuator for changing the length of the FBG element 204. Wires made of SMA materials are popularly known as "muscle wires" and the exemplary SMA member 202 is comprised of a muscle wire of selected physical dimensions (that is, length and diameter), preferably matching the dimensions of the FBG element 204.

As is well known, muscle wires are capable of generating large forces when heated, accompanied by a change of about 5% to 8% in length. In accordance with the teachings of the present invention, this property is advantageously utilized for the purpose of changing the length, thereby the spatial period of the refractive index of the fiber, of the FBG element 204. As set forth in greater detail hereinabove, such a change in the spatial period of the refractive index gives rise to a corresponding change in the Bragg resonance wavelength of the FBG element. For example, a 5% change in the length results in a 5% change in the Bragg resonance wavelength of 1500 nm of a typical FBG element. That is, in an optical network using 1500 nm signals, a tuning range of about 77.5 nm is advantageously achieved by practicing the present invention. Those skilled in the art should readily recognize that this tuning range can easily accommodate a DWDM optical signal having 32 channels with a channel spacing of 100 GHz (which equals 0.8 nm) because the total channel bandwidth is about 26 nm only, which is well within the range. Further, the tuning range of an optical filter provided in accordance with the teachings of the present invention also surpasses the gain profiles of current Erbium-Doped Fiber Amplifiers (EDFA) which is in the range of about 30 to 50 nm, centered around 1500 nm.

In the exemplary embodiment illustrated in FIG. 2B, the SMA member 202 is disposed longitudinally along the length of the FBG element 204 such that the ends of the SMA member are bonded to the corresponding end of the FBG element. Accordingly, bonding contacts 210 and 212 are exemplified herein. However, those skilled in the art should appreciate that several such discrete bonding contacts or a single continuous bond may be provided between the FBG element 204 and the SMA member 202 along the length.

The bonding between the SMA member 202 and the FBG element 204 is preferably provided for effectuating a compression in the length of the FBG element when the SMA member undergoes a contraction. A current source 206 is included for providing electrical current to the SMA member 202 via wires 217 and 219 connected to the ends of the SMA member. When electrical power is applied, the SMA member 202 heats up due to its resistivity properties and, correspondingly, contracts in length. The closed-loop controller 208 coupled to the current source 206 may then be used for tuning the reflected wavelength of the FBG element 204 by appropriately controlling the amount of current applied to the SMA member 202.

In some alternative implementations, the FBG element 204 and the SMA member 202 may be encased tightly in a suitable tube-like structure or a plurality of "binding" rings for the purpose of transferring the length deformation caused by the self-resistive heating of the SMA member. It should be apparent that bonding between the SMA member 202 and the FBG element 204 may not be necessary in such implementations.

Figure 2C:
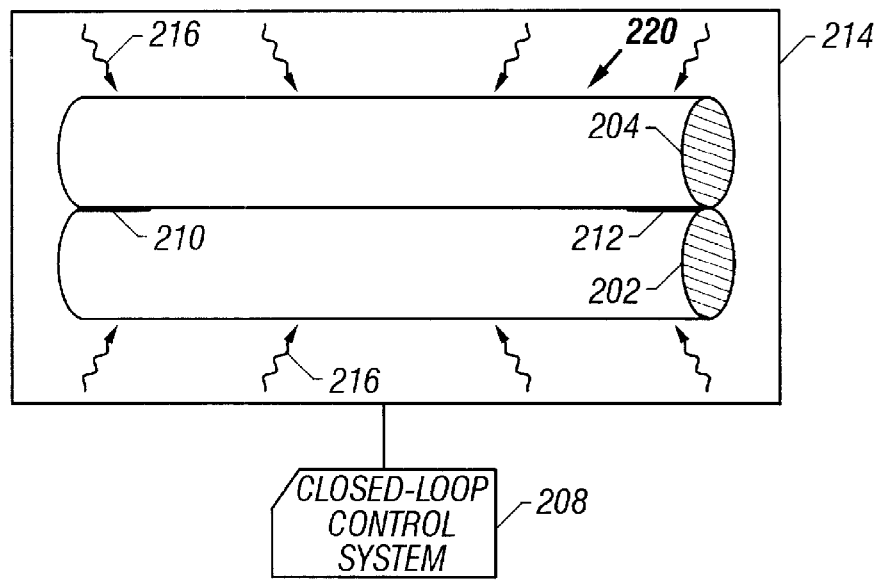
FIG. 2C depicts another exemplary embodiment of a wide tuning range FBGF of the present invention using at least one SMA member.

Referring now to FIG. 2C, another exemplary embodiment of a wide tuning range FBGF is illustrated. Those skilled in the art should readily recognize that instead of a current source for heating, a thermal source 214 (e.g., an oven in a Peltier-cooling arrangement) is provided for heating the SMA member 202 in this embodiment. The FBG/SMA combination 220, bonded or otherwise coupled tightly in a tube, is suitably disposed in a chamber associated with the thermal source 214 such that thermal energy 216 is applied in a controlled manner to the SMA member by appropriately utilizing the closed-loop controller 208 coupled to the thermal source 214. Specific changes in the Bragg resonance wavelength of the FBG element 204 are thereby effectuated for wavelength tuning.

Figure 3:
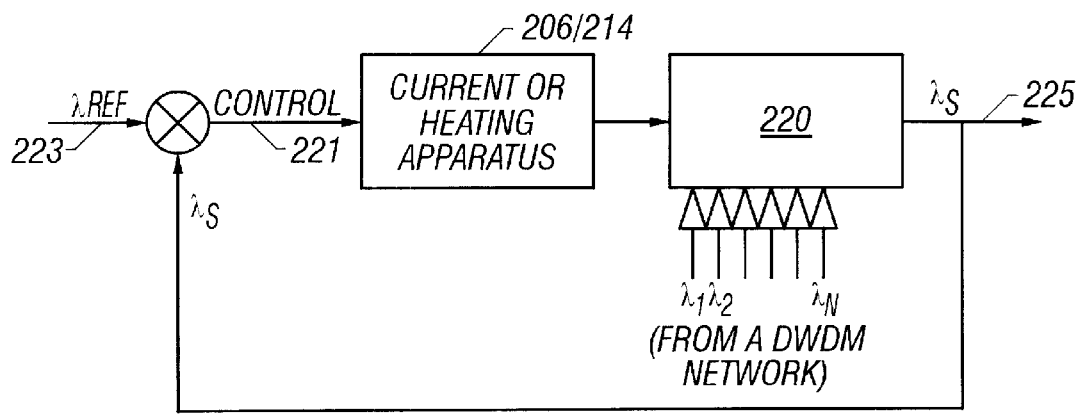
FIG. 3 depicts an exemplary closed-loop arrangement for controlling the wavelength selectivity properties of a wide tuning range FBGF of the present invention.

FIG. 3 depicts an exemplary feedback control arrangement for controlling the wavelength selectivity properties of a wide-range tunable FBGF of the present invention. A control signal 221 is generated based upon comparing a reference input 223 (which may be a reference wavelength $\lambda_{REF}$ or some other relevant optical/electronic parameter that is channel-specific) with an output 225 that corresponds to the selected wavelength $\lambda_s$ filtered by the FBG/SMA combination 220. The control signal 221 is provided to the current/thermal source 206/214 such that energy to the FBG/SMA combination 220 is suitably modulated.

It should be apparent that the feedback control arrangement depicted is FIG. 3 is provided for illustrative purposes only. Accordingly, other optoelectronic components such as, for example, circulators, optical-electrical interfaces, etc. are not shown herein.

Figure 4A:
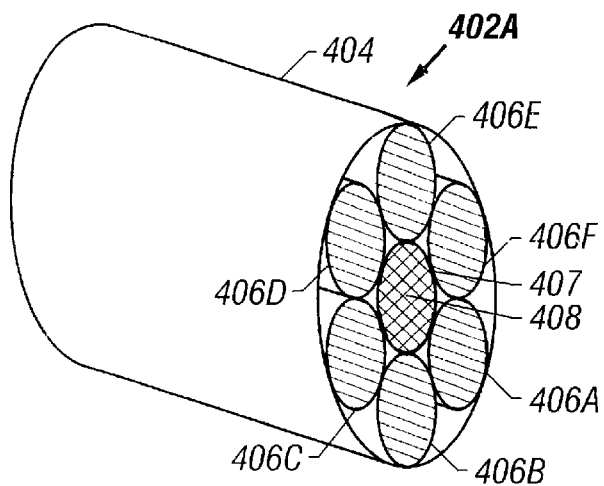
FIG. 4A depicts a presently preferred exemplary embodiment of a hex-pack configuration with six SMA members surrounding an FBG element for making a wide tuning range FBGF in accordance with the teachings of the present invention.

FIG. 4A depicts a presently preferred exemplary embodiment of an FBG/SMA combination 402A wherein six SMA members 406A–406F are disposed around an FBG element 408 in a hexagonal ("hex-pack") configuration. The hex-pack FBG/SMA combination 402A is packed into a tube 404 for providing the necessary "binding" or "coupling" between the FBG element 408 and the SMA members 406A–406F in order to effectuate length contraction in the FBG element upon suitable heating of the SMA members. Although bonding contacts, e.g., contact 407, between the FBG element 408 and the SMA members 406A–406F are shown in this FIG., it should be apparent that such bonding contacts may not be necessary in this exemplary hex-pack FBG/SMA combination.

Figure 4B:
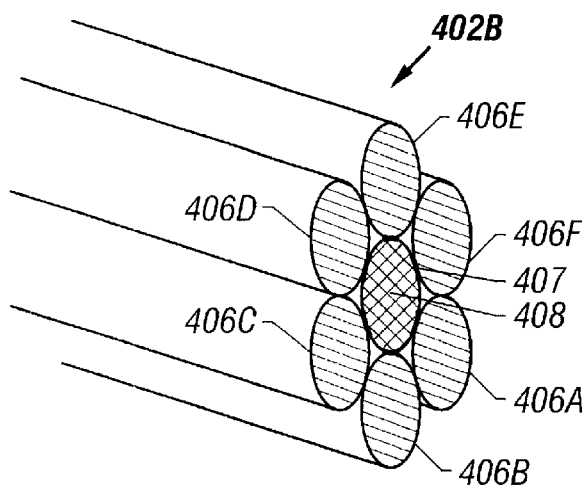
FIG. 4B depicts another presently preferred exemplary embodiment of a hex-pack configuration with six SMA members.

In the exemplary hex-pack FBG/SMA combination 402B depicted in FIG. 4B, no outer tubing is provided for holding the SMA members around the FBG element 408 and, accordingly, bonding contacts (e.g., contact 407) are necessary in order to transfer the contractive forces generated in the SMA members to the core FBG element. Such bonding contacts may be disposed at the ends of the hex-pack FBG/SMA combination 402B as illustrated herein, or they may be disposed along the length at several spots.

Figure 4C:
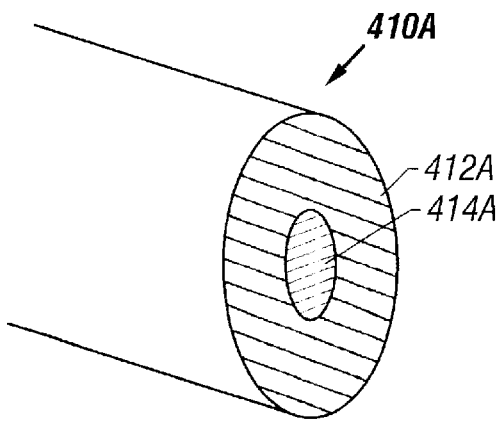
FIG. 4C depicts an exemplary single-mode fiber for use in making a wide-range tunable FBGF of the present invention.
Figure 4D:
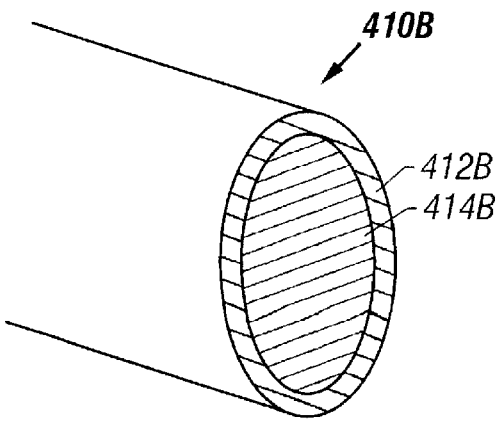
FIG. 4D depicts an exemplary multi-mode fiber for use in making a wide-range tunable FBGF of the present invention.

FIGS. 4C and 4D depict two exemplary fibers for use as an FBG element in a wide-range tunable optical filter of the present invention. Although a multi-mode fiber 410B having a wider core 414B (diameter of about 50 μm or 62.5 μm) is also illustrated, a single-mode fiber 410A (diameter of about 125 μm) having a narrow core 414A (diameter of about 8–10 μm) surrounded by a cladding 412A is presently preferred.

Figure 5:
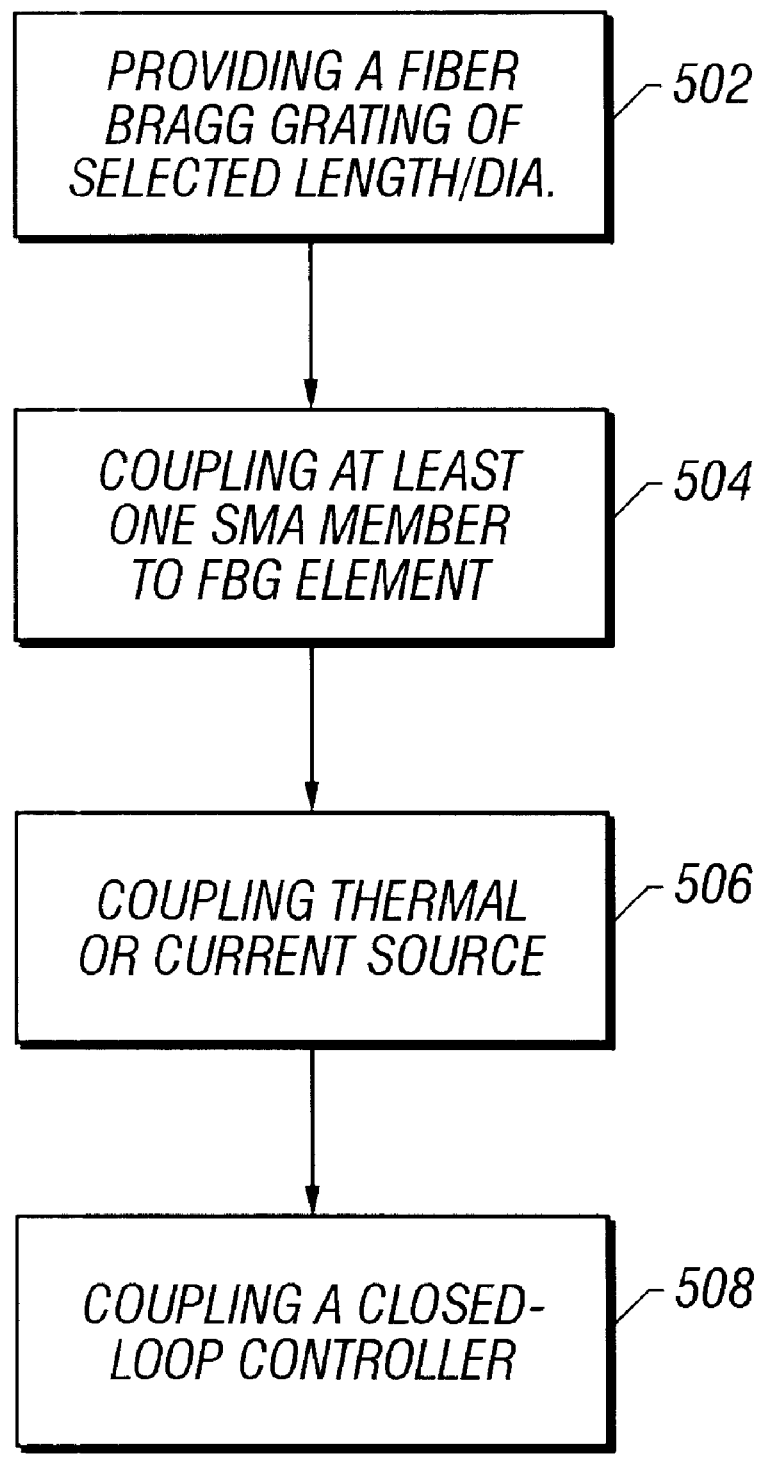
FIG. 5 is a flow chart illustrating an exemplary method of making a wide-range tunable FBGF in accordance with the teachings of the present invention.

Referring now to FIG. 5, depicted therein is a flow chart of the various steps involved in making a wide-range optical filter of the present invention. After furnishing a fiber Bragg grating element with a selected Bragg resonance wavelength and predetermined dimensions (i.e., length and diameter) (step 502), at least one SMA member of matching physical dimensions is coupled to the FBG element (step 504) by bonding or by packing in a tube, rings, and the like. A thermal source or an electric current source is coupled to the FBG/SMA arrangement (step 506) for providing energy. Preferably, a closed-loop controller is coupled to the thermal/current source such that a controlled amount of energy is provided to the FBG/SMA arrangement in order to tune the wavelength of reflected signals.

Figure 6:
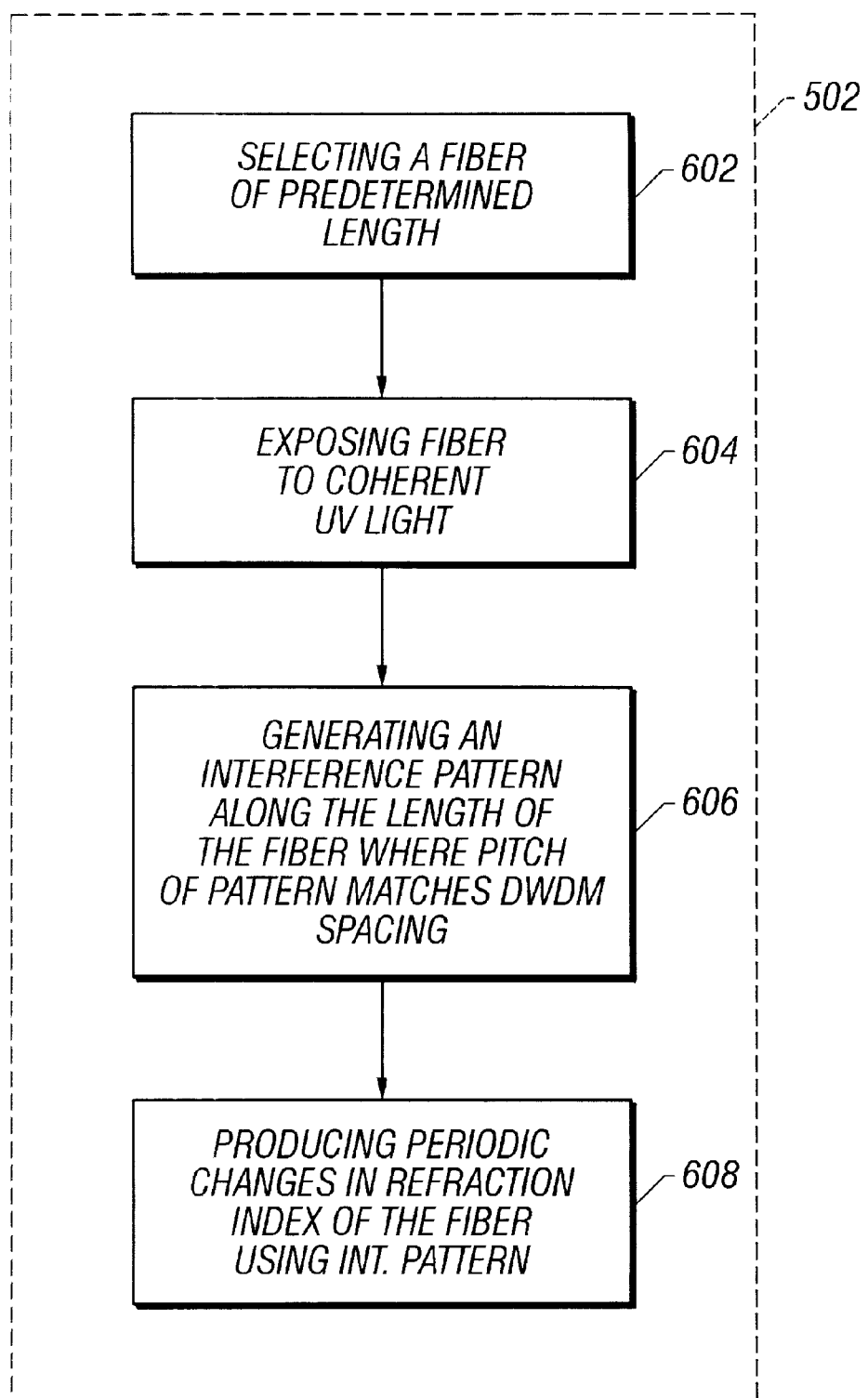
FIG. 6 is a flow chart illustrating an exemplary method of making a fiber Bragg grating element for use with a wide-range tunable FBGF of the present invention.

FIG. 6 is a flow chart that illustrates the various steps involved in providing a suitable FBG element (step 502) for use with a wide-range tunable optical filter of the present invention. Preferably, a single-mode fiber of a predetermined length is used for making the FBG element (step 602). The fiber is exposed to coherent UV light (step 604) wherein an interference pattern is generated along the length of the fiber such that the pitch of the interference fringe pattern matches the channel spacing of the multiplexed optical signal (step 606). That is, if a channel spacing of 0.8 nm is provided in the multiplexed signal with multiple wavelengths, the pitch of the interference pattern is also preferably provided to be around 0.8 nm. Because of the interaction between the UV light and the fiber, the interference pattern defines a spatial periodicity in the index of refraction of the fiber (step 608). Accordingly, a Bragg grating is "written" into the fiber to create an optical element having a specified Bragg resonance wavelength.

Figure 7:
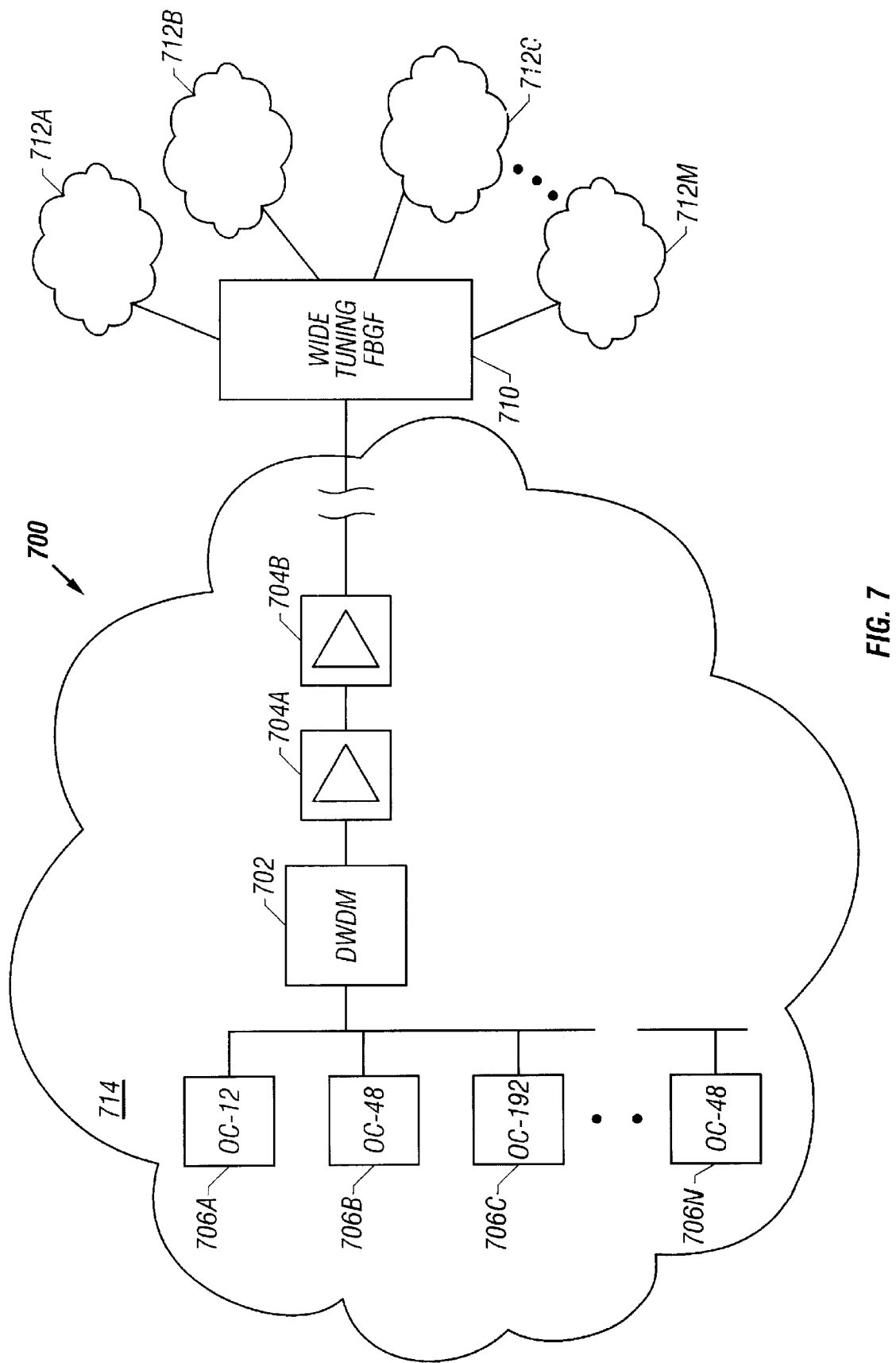
FIG. 7 depicts an exemplary dense wavelength division multiplex (DWDM) optical network wherein a wide-range tunable FBGF of the present invention is advantageously employed.

FIG. 7 depicts an exemplary DWDM optical network 700 where a wide-range tunable optical filter 710 of the present invention may be advantageously employed. An optical network portion 714 (for example, a long-haul network, a regional network, et cetera) includes a DWDM system 702 for multiplexing several optical signals (e.g., 706A–706N) on the same fiber, wherein each signal—which may be carrying a separate payload with a particular bit rate—is assigned a particular wavelength (i.e., channel). For example, multiple OC-12, OC-48, OC-192 signals are illustrated herein.

Optical amplifiers with suitable gain profiles, e.g., amplifier 704A and amplifier 704B, are included in order to compensate for transmission losses in the network portion 714. Upon receiving the multiplexed signal, the optical filter 710 separates the individual wavelengths and provides the signals to access networks such as, e.g., networks 712A–712M. Those skilled in the art should appreciate that the wide-range tunable optical filter 710 may also be embodied as a tunable optical Add/Drop Multiplexer (OADM) on a SONET ring that is coupled to the various access networks.

Based upon the foregoing Detailed Description, it should be readily apparent that the present invention provides a cost-effective and easy-to-manufacture optical filter solution that advantageously overcomes the shortcomings and deficiencies of the conventional optical filters used in today's optical networks. A tunable optical filter provided in accordance with the teachings of the present invention exhibits a wide bandwidth performance that is highly desirable in terms of harnessing the benefits of advanced technologies such as DWDM techniques and EDFAs that are necessary in All Optical Network of the Future (AONF) and "deep fiber" network architectures. In addition to having a wide tuning range, the optical filter of the present invention provides a narrow optical passband with a sharp cutoff because of the narrow notch in the transmitted wavelengths, thereby insuring that little or no cross-channel interference exists in the wavelength selection process. it is believed that the operation and construction of the present invention will be apparent from the foregoing Detailed Description. While the method and apparatus shown and described have been characterized as being preferred, it should be readily understood that various changes and modifications could be made therein without departing from the scope of the present invention as set forth in the following claims. For example, several SMA materials having transition temperatures and training temperatures suitable for the purposes of the present invention are known (e.g., Nitinol) and, therefore, all such alloys may be used for making a wide-range tunable optical filter in accordance herewith. Also, those skilled in the art should readily recognize that several bonding/coupling techniques are available for packing the SMA members with an FBG element (with or without a tube-like encasement) in making a wide-range tunable optical filter of the present invention and, accordingly, the present invention may be practiced with all such techniques.

In addition, although the use of fibers optimized for 1500 nm signals (where transmission losses are about 0.25 dB/km) is exemplified, it should be apparent that fibers for 1310 nm signals (having transmission losses of about 0.5 dB/km) may also be used for making an optical filter in accordance herewith. Moreover, the present invention may be practiced with any known or hitherto unknown techniques of feedback control for the purpose of controlling energy inputs to the SMA members which may vary widely in number. Furthermore, by coupling the optical filter of the present invention with an active medium, a tunable wavelength light source may be advantageously provided. Accordingly, all these numerous modifications, substitutions, additions, combinations, extensions, etc. are considered to be within the ambit of the present invention whose scope is limited solely by the following claims.

What is claimed is:

1. A tunable optical filter, comprising:
    a fiber having a selected length for conducting optical signals, said fiber including a Bragg grating with a predetermined period of a refractive index for reflecting back a plurality of reflected optical signals having a selected wavelength;
    an actuator coupled to said fiber for varying said predetermined period of the refractive index by changing the length of said fiber, said actuator including six Shape Memory Alloy (SMA) members disposed around said fiber in a hexagonal configuration and means for causing a change in the length of said SMA members so as to generate a corresponding change in the length of said fiber; and
    a closed-loop controller that controls said actuator by monitoring a parameter associated with said plurality of reflected optical signals.

2. The tunable optical filter as set forth in claim 1, wherein said means for causing a change in the length of said SMA members comprises a heating device for supplying a controlled amount of heat to said SMA members.

3. The tunable optical filter as set forth in claim 2, wherein each SNA member has a length substantially the same as the length of said fiber.

4. The tunable optical filter as set forth in claim 3, wherein each of said SMA members is bonded to said fiber.

5. The tunable optical filter as set forth in claim 3, wherein said hexagonal configuration is packed in a tube.

6. The tunable optical filter as set forth in claim 3, wherein said fiber is about between 3 and 36 inches long, and comprises a single-mode fiber.

7. The tunable optical filter as set forth in claim 3, wherein said fiber comprises a multi-mode fiber.

8. The tunable optical filter as set forth in claim 1, wherein said means for causing a change in the length of said SMA members comprises a current source for supplying a controlled amount of current to said SMA members.

9. The tunable optical filter as set forth in claim 8, wherein each SMA member has a length substantially the same as the length of said fiber.

10. The tunable optical filter as set forth in claim 9, wherein each of said SMA members is bonded to said fiber.

11. The tunable optical filter as set forth in claim 9, wherein said hexagonal configuration is packed in a tube.

12. The tunable optical filter as set forth in claim 9, wherein said fiber is about between 3 and 36 inches long, and comprises a single-mode fiber.

13. The tunable optical filter as set forth in claim 9, wherein said fiber comprises a multi-mode fiber.

14. An optical filter having a variable tuning range, comprising:
    a fiber having a selected length and a selected diameter for conducting optical signals, said fiber including a Bragg grating with a predetermined pitch for reflecting back a plurality of reflected optical signals having a selected wavelength;
    a plurality of Shape Memory Alloy (SMA) members disposed around said fiber in a longitudinal configuration, each SMA member having a length and a diameter substantially the same as the length and the diameter of said fiber, wherein the ends of said SMA members are bonded to the ends of said fiber; and
    a current source for supplying a controlled amount of current to said SMA members to cause a change in their length, thereby generating a corresponding change in the length of said fiber, said corresponding change in the length of said fiber causing a change in the pitch of said Bragg grating such that said plurality of reflected optical signals tune to a different wavelength.

15. The optical filter having a variable tuning range as set forth in claim 14, wherein said plurality of SMA members comprises six SMA members disposed in a hex-pack surrounding said fiber.

16. The optical filter having a variable tuning range as set forth in claim 15, wherein said fiber comprises a single-mode fiber optimized for around 1500 nm.

17. The optical filter having a variable tuning range as set forth in claim 15, wherein said fiber comprises a single-mode fiber optimized for around 1310 nm.

18. The optical filter having a variable tuning range as set forth in claim 15, wherein said fiber comprises a multi-mode fiber optimized for around 1500 nm.

19. The optical filter having a variable tuning range as set forth in claim 15, wherein said fiber comprises a multi-mode fiber optimized for around 1310 nm.

20. A method of making a tunable optical filter, comprising the steps of:
    providing a fiber Bragg grating member of a selected length and a selected diameter;
    bonding a plurality of Shape Memory Alloy (SMA) members to said fiber Bragg grating member, each SMA member having a length and a diameter substantially the same as the length and the diameter of said fiber Bragg grating member, such that said SMA members are disposed longitudinally along the length of said fiber Bragg grating member and the ends of said SMA members are attached to the ends of said fiber Bragg grating member; and
    coupling a current source to said plurality of SMA members, wherein said current source is in a closed-loop control arrangement with an output provided by said fiber Bragg grating member such that a controlled amount of current is applied to said SMA members to cause a change in their length, thereby effectuating a corresponding change in the length of said fiber Bragg grating member.

21. The method of making a tunable optical filter as set forth in claim 20, wherein said plurality of SMA members comprises six SMA members, each surrounding said fiber Bragg grating member in a hex-pack configuration.

22. The method of making a tunable optical filter as set forth in claim 21, wherein said step of providing a fiber Bragg grating member further comprises the steps of:
    exposing a single-mode fiber of said selected length and diameter to coherent Ultra-Violet radiation;
    generating an interference pattern having a periodic pitch along the length of said single-mode fiber; and
    producing periodic changes in the index of refraction of said single-mode fiber, said periodic changes spatially corresponding to said periodic pitch of said interference pattern along the length of said single-mode fiber.

23. A method of making a tunable optical filter, comprising the steps of:

provi ding a fiber Bragg grating member of a selected length and a selected diameter;

bonding a plurality of Shape Memory Alloy (SMA) members to said fiber Bragg grating member, each SMA member having a length and a diameter substantially the same as the length and the diameter of said fiber Bragg grating member, such that said SMA members are disposed longitudinally along the length of said fiber Bragg grating member and the ends of said SMA members are attached to the ends of said fiber Bragg grating member; and thermally coupling a heat source to said plurality of SMA members, wherein said heat source is in a closed-loop control arrangement with an output provided by said fiber Bragg grating member such that a controlled amount of heat is applied to said SMA members to cause a change in their length, thereby effectuating a corresponding change in the length of said fiber Bragg grating member.

24. The method of making a tunable optical filter as set forth in claim 23, wherein said plurality of SMA members comprises six SMA members, each surrounding said fiber Bragg grating member in a hex-pack configuration.

25. The method of making a tunable optical filter as set forth in claim 24, wherein said step of providing a fiber Bragg grating member further comprises the steps of:

exposing a single-mode fiber of said selected length and diameter to coherent Ultra-Violet radiation;

generating an interference pattern having a periodic pitch along the length of said single-mode fiber; and producing periodic changes in the index of refraction of said single-mode fiber, said periodic changes spatially corresponding to said periodic pitch of said interference pattern along the length of said single-mode fiber.

* * * * *